United States Patent Office 2,950,320
Patented Aug. 23, 1960

2,950,320

5-BENZOYL PENTANOL-1

Edwin J. Vandenberg, Wilmington, Del., assignor to Hercules Powder Company, Wilmington, Del., a corporation of Delaware No Drawing. Filed May 27, 1953, Ser. No. 357,905

1 Claim. (Cl. 260—592)

This invention relates to the acid catalyzed cleavage of phenylcyclohexane hydroperoxide and more particularly to the production of phenol, cyclohexanone and 5-benzoyl pentanol-1 as cleavage products thereof.

Copending application, Serial No. 320,335, filed November 13, 1952, by Milton A. Taves, now abandoned, describes and claims a method for the cleavage of phenylcyclohexane hydroperoxide using sulfuric acid as a catalyst. The products of this cleavage are phenol and cyclohexanone.

In accordance with the present invention, it has now been found that 5-benzoyl pentanol-1 is produced by a cleavage reaction from phenylcyclohexane hydroperoxide by contacting phenylcyclohexane hydroperoxide with a clay catalyst.

The method of effecting this cleavage of phenylcyclohexane hydroperoxide is more particularly described in the following examples in which all parts and percentages are by weight.

EXAMPLE 1

*Phenylcyclohexane hydroperoxide preparation*

An oxidation vessel equipped with a reflux condenser and an oxygen inlet tube was charged with 100 parts of phenylcyclohexane and 2.0 parts of calcium hydroxide. Oxygen was passed through the reaction mixture at a temperature of 90° C. and the progress of the oxidation was followed by periodic determination of hydroperoxide content. This involved removal of a sample of the reaction mixture, addition of the sample to an acidified potassium iodide solution and determination of the amount of iodine liberated by titration with a standard thiosulfate solution. After about 150 hours contacting with oxygen, by which time the hydroperoxide content had reached 30%, the oxidation was discontinued and the lime was removed by filtration.

The pure phenylcyclohexane hydroperoxide was separated from an oxidized phenylcyclohexane, containing 30% hydroperoxide and prepared as above, by diluting with about 3.5 times its volume with n-pentane and cooling at −15° C. for a week. The phenylcyclohexane hydroperoxide crystallized out on seeding and was recrystallized from n-pentane. The yield was about 40% of the theoretical based on hydroperoxide analysis of crystals melting at 58–60° C.

*Cleavage.*—A solution of 306.8 parts phenylcyclohexane hydroperoxide crystals dissolved in 440 parts benzene was added gradually to a slurry of 30.7 parts acid-activated montmorillonite in 2200 parts benzene. The temperature of the solution rose from 23° C. to 28° C. during the addition. After 1.5 hours ca. 125 mm. vacuum was applied to the reaction vessel to produce gentle boiling and the temperature was held at 30° C. for 22 hours at which time the hydroperoxide had been substantially completely cleaved. The solution was then filtered and concentrated to one-quarter its volume and was then extracted first with 400 parts 20% caustic soda solution and then with two portions of 100 parts each 20% caustic solution and the caustic solutions were saved. The caustic washed solution was dried and further concentrated by distillation.

The cut boiling at 52–54° C. (20 mm.) amounting to 62.2 parts was cyclohexanone of about 95% purity.

The cut boiling at 136–156° C. (0.4 mm.) amounting to 30.2 parts was separated as 5-benzoyl pentanol-1. It analyzed 8.09% OH (acetylation) and 14.6% carbonyl (Desseigne) and melted at 18–22° C. indicating 5-benzoyl pentanol-1 of about 92% purity. On further crystallization from 2:1 ether-pentane at −15° C., a pure product of melting point 24.8–25.4° C. was obtained. This 5-benzoyl pentanol-1 was readily characterized by oxidation with chromic acid to 5-benzoyl pentanoic acid melting at 77–78° C. It was shown to have ultraviolet absorption, $\alpha$ 72, at 238 mm$\mu$ in neohexane and to be readily analyzed quantitatively in a cleavage mixture containing the same by means of ultraviolet analysis.

The 20% caustic soda solutions used for washing the cleavage product were combined and acidified with 1000 parts 10% hydrochloric acid. The acidified mixture was then extracted with four portions of ether. The ether extract after being dried and distilled on a steam bath yielded a residue amounting to 80.7 parts and consisting of phenol, boiling point 83–91° C. (16 mm.).

The yield (% of theory) was thus 40.5% cyclohexanone, 30.2% 5-benzoyl pentanol-1 and 55% phenol.

EXAMPLE 2

Air-oxidized phenylcyclohexane containing 30% phenylcyclohexane hydroperoxide was passed through a heated tube packed with bentonite at 80° C. with a contact time of two hours. The effluent phenylcyclohexane solution analyzed less than 0.1% hydroperoxide and about 10% 5-benzoyl pentanol-1 and about 7% phenol.

EXAMPLE 3

A solution of 5 parts phenylcyclohexane hydroperoxide in 100 parts benzene solution was heated at about 80° C. for 24 hours with 1 part bentonite. The solution then analyzed 3% hydroperoxide and 0.7% 5-benzoyl pentanol-1 by ultraviolet analysis using the peak at 238 mm$\mu$ of 5-benzoyl pentanol-1.

EXAMPLE 4

Example 3 was repeated using acid-washed kaolinite (peerless clay) in place of bentonite and a heating time of about three days. All of the hydroperoxide underwent reaction and the resulting solution contained 1.4% 5-benzoyl pentanol-1.

EXAMPLE 5

A solution of air-oxidized phenylcyclohexane containing 30% phenylcyclohexane hydroperoxide was mixed with 30% by weight of acid-activated montmorillonite (calcined) and allowed to stand three weeks at −15° C. The mixture was then warmed to 25° C. and filtered at once. The filtrate was shown by ultraviolet analysis to contain 5% 5-benzoyl pentanol-1.

EXAMPLE 6

Air-oxidized phenylcyclohexane containing 30% hydroperoxide was heated at 75–80° C. with 1% its weight of acid-washed calcined fuller's earth while stirring for two days. The fuller's earth was removed by filtration and the filtrate was shown by analysis to contain substantially no hydroperoxide. It was shown by ultraviolet absorption analysis to contain 10% 5-benzoyl pentanol-1.

As shown by Example 1, phenylcyclohexane hydroperoxide may be produced by oxidizing phenylcyclohexane under substantially anhydrous conditions with molecular oxygen using calcium hydroxide as an alkaline stabilizing agent. In general, however, the oxidation may be carried out in the liquid phase using air or molecular oxygen as the oxidizing agents. It is preferred to effect the oxidation under noncatalytic conditions. The liquid phase may be either substantially homogeneous as when anhydrous conditions are used, or it may be heterogeneous as when there is included a separate aqueous phase, which may be either ordinary water or an aqueous alkaline solution.

The temperature during oxidation will generally be in excess of 20° C. Using anhydrous conditions the temperature is preferably between about 50° C. and about 200° C. When using an aqueous phase the temperature is preferably between about 50° C. and about 95° C. When pressure is applied to the aqueous oxidation system, however, the temperature may be increased considerably above 95° C., for example, up to about 200° C. Pressure also may be used in the anhydrous oxidation system.

It is desirable to effect the oxidation in the presence of an alkaline stabilizing agent. Example 1 has shown the use of calcium hydroxide, but in general there may be used the alkali metal hydroxides such as the hydroxides of sodium, potassium, lithium, and the like; alkaline earth metal oxides and hydroxides such as calcium hydroxide, barium hydroxide, strontium hydroxide, calcium oxide and barium oxide; inorganic carbonates and bicarbonates such as sodium carbonate and bicarbonate, and alkali metal salts of weak organic acids may also be employed. Strong organic bases such as trialkylaryl ammonium hydroxides, for example, trimethylbenzyl ammonium hydroxide, may be used. Ammonia also is operable. These alkaline stabilizing agents may be used either in the form of an aqueous solution or as part of an anhydrous oxidation reaction mixture. When used under anhydrous conditions, the alkali preferably is in finely divided form and the amount may be varied from about 0.05 to about 10% by weight based on the phenylcyclohexane being oxidized. A preferable range on this basis is from about 1 to about 5%. When used in the form of an aqueous solution, the solution will contain between about 0.01 and about 35% by weight of the alkali. Preferably, the concentration of alkali in solution will be between about 0.01 and about 2%. The ratio of the quantity of aqueous alkaline solution present in the reaction mixture to the phenylcyclohexane may be varied within wide limits from about 1:50 to about 10:1. It is preferable, however, to utilize a ratio within the range of from about 1:10 to about 1:3.

It is also desirable to carry out the oxidation in the presence of a peroxidic free radical oxidation initiator. In general, there may be used any peroxidic substance which is capable of decomposing to form organic free radicals and of initiating a free radical oxidation chain under the conditions utilized. Representative materials are acetyl peroxide, benzoyl peroxide, triphenylmethyl peroxide, t-butyl hydroperoxide, tetralin hydroperoxide, phenylcyclohexane hydroperoxide, and naphthene hydroperoxides. These peroxidic materials include the acyl, aroyl, dialkyl and diaralkyl peroxides, and the alkyl, aralkyl, cycloalkyl, arcycloalkyl and cycloalkenyl hydroperoxides. On the basis of the pure peroxidic material, the concentration of this material added to the phenylcyclohexane being oxidized may be varied from about 0.01 to about 20%, based on the phenylcyclohexane, a preferable range being from about 0.1 to about 10%. It is preferred to use phenylcyclohexane hydroperoxide.

Instead of oxygen, air may be utilized; but also operable are mixtures of oxygen with nitrogen or other inert gases. The rate of input of the oxygen-containing gas should be such that at least the theoretical amount of oxygen is supplied. By "theoretical amount" is meant that amount of oxygen necessary to convert the phenylcyclohexane completely to the corresponding hydroperoxide. Actually, it is preferable to use about twice the theoretical amount of oxygen. The rate of input will depend upon the temperature and pressure utilized. For example, it is possible to determine the rate of oxidation of phenylcyclohexane at any particular temperature and pressure and, knowing the rate of oxidation, it then is possible to calculate the amount of oxygen necessary to obtain the required rate. This amount of oxygen is the theoretical amount. In general, the rate of input at atmospheric pressure will be from about 1 to about 100 liters per hr. per kg. of phenylcyclohexane, and under pressures of, for example, 50–200 p.s.i., will be from about 50 to about 350 liters per hr. per kg. of phenylcyclohexane. The oxidation may be carried out either batchwise or continuously.

In carrying out the cleavage of phenylcyclohexane hydroperoxide, several different modifications of the hydroperoxide may be used. The hydroperoxide may be, for example, either in the form of the pure hydroperoxide or in the form of a crude oxidation reaction mixture containing the hydroperoxide. In the oxidation of phenylcyclohexane, the oxidation usually is interrupted before all of the hydrocarbon has reacted in order to avoid or limit side reactions. The hydroperoxide then is obtained in admixture with phenylcyclohexane and possibly some secondary reaction products, and this mixture may be used as such for the cleavage reaction.

If it is desired to utilize phenylcyclohexane hydroperoxide in a more concentrated form in order to obtain optimum yields of 5-benzoyl pentanol-1 and to facilitate isolation of these reaction products, or to use another solvent in the cleavage reaction, a concentrated hydroperoxide may be prepared by steam distillation of the oxidation reaction mixture to remove unreacted phenylcyclohexane as distillate. A concentrated hydroperoxide also may be prepared by subjecting the oxidation reaction mixture to fractional distillation, preferably under reduced pressure. The pure hydroperoxide may be obtained from the oxidation reaction mixture by crystallization which may be facilitated by first distilling off at least part of the phenylcyclohexane. To the concentrate so produced it then is desirable to add a hydrocarbon such as petroleum ether or hexane in order that the hydroperoxide will crystallize out to as great an extent as possible.

The cleavage of phenycyclohexane hydroperoxide is most satisfactorily carried out under substantially anhydrous conditions using a suitable organic solvent which is inert to any of the reactants, products, or reaction conditions involved in the process. The solvent should be nonreactive under the conditions of reaction to the hydroperoxide, the catalyst, and the 5-benzoyl pentanol-1. Exemplary of such solvents are the aliphatic, cycloaliphatic, and aromatic hydrocarbons, alcohols, ketones, ethers, esters, and liquid chlorinated hydrocarbons. Exemplary of these solvents are pentane, hexane, benzene, toluene, xylene, cumene, phenylcyclohexane, chloroform, carbon tetrachloride, ethanol, acetone, methyl acetate, and diethyl ether. Optimum results are obtained when the concentration of the hydroperoxide in the solvent being used is between about 5 and about 30% by weight. The resulting solution of hydroperoxide in solvent is relatively dilute and this reduces side reactions and results in high 5-benzoyl pentanol-1 yields.

The products of this invention are readily separated from each other. For instance, all of the products can be separated from each other by distillation of the reaction mixture, preferably under reduced pressure. Alternatively, the phenol may be separated first by extraction with an aqueous sodium hydroxide solution and the cyclohexanone and 5-benzoyl pentanol-1 may be separated from each other by distillation. If desired, the 5-benzoyl pentanol-1 may be recovered by crystallization from the reaction mixture before or after removing the phenol by distillation or caustic extraction, or it may be recovered by crystallization from the distillation residue after removing the phenol and cyclohexanone. The recovery of each of the products individually is not essential to the practice of this invention.

The clays which are active as catalysts in accordance with this invention are hydrous aluminum silicates. Clays as found in nature often are to some degree partially neutralized by alkali or alkali earth metals. These clays are effective catalysts if they are weakly acidic, i.e., act as proton donors under the reaction conditions. In aqueous solution they may actually exhibit a pH on the alkaline side but still be weakly acidic under the reaction conditions of the present invention. However, if they are not weakly acidic, they can be made weakly acidic by removal of the alkali or alkali earth metals, if desired. This is accomplished by treatment with an acid such as hydrochloric acid followed by washing with fresh water. Such treatments for removing alkali and alkali earth metals from clays in order to increase their activity are well known. Clays which are active as they occur in nature or are rendered more active by acid treatment of this type are montmorillonite or montmorillonite-type clays such as hectorite and saponite, nontronite, or other clays as attapulgite, illite, zeolites, fuller's earth, Florida earth, kaolinite, bentonites, and similar clays. The clay catalysts are preferably activated by calcining to remove loosely bound water. They are also preferably "acidic," i.e., have the properties of a proton donor.

They are used in catalytic amounts from about 1% by weight based on the amount of hydroperoxide up to any practical amount. It is preferred to use between about 5 and about 50% by weight based on the hydroperoxide. The amount required is not critical. The clay may be slurried with the reaction mixture or the reaction mixture may be passed through a bed of the catalyst. Longer reaction times and higher cleavage temperatures are required when small amounts of catalyst are used than when large amounts of catalyst are used.

The temperature which may be used during the cleavage reaction may be varied rather widely depending upon the amount of catalyst. Generally, however, the temperature may be varied from about −15° C. to about 200° C. At the lower temperatures, the reaction may be somewhat slow if the amount of catalyst is low, but higher concentrations of the catalyst increase the rate of reaction considerably. A preferable temperature range is between about 25° C. and about 100° C. and a highly desirable range is between about 50° C. and about 75° C.

The examples have shown the cleavage reaction as being carried out at reduced and at atmospheric pressure, but the reaction may be effected under a broad range of pressure conditions including superatmospheric pressures. However, from the standpoint of practicality, the reaction preferably is carried out at atmospheric pressure.

The 5-benzoyl pentanol-1 produced in the process of this invention is useful as an insect repellent and insecticide. The thiocyanoacetate of 5-benzoyl pentanol-1 is a particularly useful insecticide for use in fly spray compositions where freedom from irritation to mucous membranes is important. 5-benzoyl pentanol-1 also acts as a defoliant for cotton plants. It is also useful as a plasticizer.

What I claim and desire to protect by Letters Patent is:
As a composition of matter 5-benzoyl pentanol-1.

References Cited in the file of this patent
UNITED STATES PATENTS

| | | |
|---|---|---|
| 2,597,349 | Farkas et al. | Feb. 14, 1950 |
| 2,527,640 | Lorand | Oct. 31, 1950 |
| 2,640,067 | Speier | May 26, 1953 |
| 2,671,809 | Fortuin et al. | Mar. 9, 1954 |

FOREIGN PATENTS

| | | |
|---|---|---|
| 626,095 | Great Britain | July 8, 1949 |
| 641,250 | Great Britain | Aug. 9, 1950 |
| 979,665 | France | Dec. 13, 1950 |
| 483,614 | Canada | May 27, 1952 |

OTHER REFERENCES

Chem. Abstracts, vol. 8, page 2681 (1914).
Chem. Abstracts, vol. 45, page 5871 (1945).